United States Patent
Kurtovic et al.

(10) Patent No.: US 9,440,627 B2
(45) Date of Patent: Sep. 13, 2016

(54) SYSTEMS AND METHODS FOR CALCULATING TRAILER BRAKE CONTROL PARAMETERS

(71) Applicant: Toyota Motor Engineering & Manufacturing North America, Inc., Erlanger, KY (US)

(72) Inventors: Kenan Kurtovic, Ypsilanti, MI (US); Chelsea R. White, Ann Arbor, MI (US); Nicholas S. Sitarski, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 44 days.

(21) Appl. No.: 14/288,737

(22) Filed: May 28, 2014

(65) Prior Publication Data

US 2015/0344010 A1 Dec. 3, 2015

(51) Int. Cl.
| | |
|---|---|
| *B60T 8/171* | (2006.01) |
| *B60T 8/172* | (2006.01) |
| *B60T 8/17* | (2006.01) |
| B60T 8/18 | (2006.01) |
| B60T 8/1769 | (2006.01) |

(52) U.S. Cl.
CPC .............. *B60T 8/1708* (2013.01); *B60T 8/171* (2013.01); *B60T 8/172* (2013.01)

(58) Field of Classification Search
CPC .... B60T 7/20; B60T 2230/06; B60T 8/1755; B60T 8/248; B60R 1/003; B60D 1/305
See application file for complete search history.

(56) References Cited

U.S. PATENT DOCUMENTS

| | | | |
|---|---|---|---|
| 7,196,305 B2 | 3/2007 | Shaffer et al. | |
| 7,237,790 B2 | 7/2007 | Gehring et al. | |
| 7,769,513 B2 | 8/2010 | Breed et al. | |
| 8,068,019 B2 | 11/2011 | Bennie et al. | |
| 2008/0172163 A1* | 7/2008 | Englert | B60T 7/20 701/83 |
| 2009/0093928 A1* | 4/2009 | Getman | B60T 8/1755 701/37 |
| 2009/0198425 A1* | 8/2009 | Englert | B60D 1/58 701/70 |
| 2009/0271078 A1 | 10/2009 | Dickinson | |
| 2010/0156667 A1* | 6/2010 | Bennie | B60C 23/009 340/902 |
| 2012/0200706 A1* | 8/2012 | Greenwood | B60R 1/00 348/148 |
| 2014/0085472 A1* | 3/2014 | Lu | B60R 1/002 348/148 |
| 2014/0160276 A1* | 6/2014 | Pliefke | B60R 1/00 348/118 |
| 2014/0200759 A1* | 7/2014 | Lu | B60D 1/245 701/28 |
| 2015/0203128 A1* | 7/2015 | Strano | B60D 1/30 340/431 |

FOREIGN PATENT DOCUMENTS

WO 2012103193 8/2012

* cited by examiner

*Primary Examiner* — Dale Moyer
(74) *Attorney, Agent, or Firm* — Dinsmore & Shohl, LLP

(57) ABSTRACT

Systems and vehicles for calculating trailer brake control parameters are disclosed. A system for calculating a trailer brake control parameter includes one or more processors, one or more memory modules communicatively coupled to the one or more processors, and machine readable instructions stored in the one or more memory modules. The one or more memory modules include the trailer brake control parameter. The machine readable instructions, when executed by the one or more processors, cause the system to receive an image including a trailer, determine a trailer characteristic from the image using image analysis logic stored in the one or more memory modules, and calculate the trailer brake control parameter based on the trailer characteristic.

24 Claims, 3 Drawing Sheets

SYSTEMS AND METHODS FOR CALCULATING TRAILER BRAKE CONTROL PARAMETERS

TECHNICAL FIELD

The present specification generally relates to systems and methods for trailer brake control and, more specifically, to systems and methods for calculating trailer brake control parameters.

BACKGROUND

Trailers (e.g., recreational trailers, utility trailers, boat trailers, semi-trailers, and the like) may be towed by towing vehicles (e.g., automobiles, such as trucks or the like). Some trailers include trailer brakes that may be actuated by a trailer brake controller coupled to the towing vehicle. The trailer brake controller may control the trailer brakes via an electric-over-hydraulic trailer braking system or an electric trailer braking system.

An electric-over-hydraulic trailer braking system includes hydraulic trailer brakes and an electric-over-hydraulic brake actuator coupled to the trailer that receives electrical signals from the trailer brake controller and facilitates the application of the hydraulic trailer brakes.

An electric trailer braking system includes electric trailer brakes that are applied when the trailer brake controller provides an electric current to the trailer brakes. The electric trailer brakes typically include brake shoes that frictionally engage a drum when activated. In some electric trailer braking system, an electromagnet is mounted on one end of a lever in order to actuate the brake shoes. When an electric current is applied to the electromagnet, the lever is pivoted as the electromagnet is drawn against the rotating brake drum, thereby actuating the electric trailer brakes.

A number of parameters of the trailer brake controller may influence the application of the trailer brakes. Accordingly, a need exists for alternative systems and methods for calculating trailer brake control parameters.

SUMMARY

In one embodiment, a system for calculating a trailer brake control parameter includes one or more processors, one or more memory modules communicatively coupled to the one or more processors, and machine readable instructions stored in the one or more memory modules. The one or more memory modules include the trailer brake control parameter. The machine readable instructions, when executed by the one or more processors, cause the system to receive an image including a trailer, determine a trailer characteristic from the image using image analysis logic stored in the one or more memory modules, and calculate the trailer brake control parameter based on the trailer characteristic.

In another embodiment, a system for calculating a trailer brake control parameter includes one or more processors, one or more memory modules communicatively coupled to the one or more processors, and machine readable instructions stored in the one or more memory modules. The one or more memory modules include the trailer brake control parameter. The machine readable instructions, when executed by the one or more processors, cause the system to receive an image including a trailer, determine a trailer characteristic from the image using image analysis logic stored in the one or more memory modules, prompt a user to adjust the trailer characteristic, receive an adjustment to the trailer characteristic, adjust the trailer characteristic based on the received adjustment, and calculate the trailer brake control parameter based on the adjusted trailer characteristic.

In yet another embodiment, a method for calculating a trailer brake control parameter includes receiving, by a computer, an image including a trailer, determining a trailer characteristic from the image with image analysis logic stored in one or more memory modules of the computer, and calculating, by the computer, the trailer brake control parameter based on the trailer characteristic.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include systems and methods for calculating trailer brake control parameters. Referring generally to the figures, a system for calculating trailer brake control parameters may include a processor, a memory module including a trailer brake control parameter, and machine readable instructions stored in the memory module. The machine readable instructions may cause the system to receive an image including a trailer, determine a trailer characteristic from the image using image analysis logic stored in the memory module, and calculate the trailer brake control parameter based on the trailer characteristic. The various systems and methods for calculating trailer brake control parameters will be described in more detail herein with specific reference to the corresponding drawings.

Figure 1:
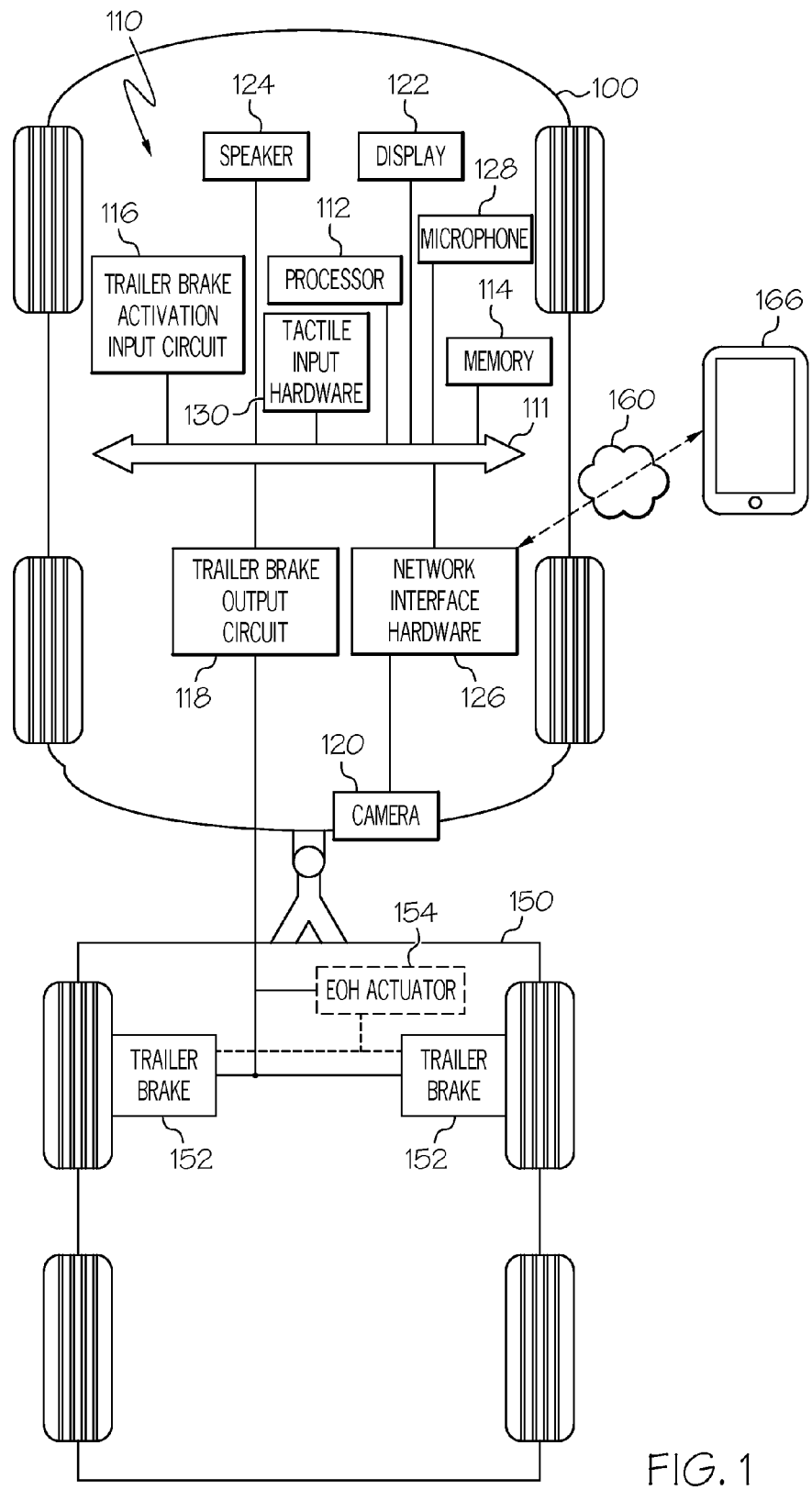
FIG. 1 schematically depicts a vehicle including a system for calculating trailer brake control parameters, according to one or more embodiments shown and described herein.

Referring now to FIG. 1, one embodiment of a towing vehicle 100 coupled to and operable to tow a trailer 150 is schematically depicted. The trailer 150 may be any unpowered vehicle including one or more wheels capable of being towed by the towing vehicle 100. By way of non-limiting example, the trailer 150 may be a recreational trailer, a utility trailer, a boat trailer, a semi-trailer, or the like. The trailer 150 includes a plurality of trailer brakes 152. As depicted in FIG. 1, the trailer 150 includes two trailer brakes 152, one coupled to each wheel of the front axle. However, it should be understood that in other embodiments, the trailer 150 may include more than or less than two trailer brakes 152, such as in embodiments in which the trailer 150 includes multiple axles with one or more trailer brakes 152 associated with each axle. In some embodiments, such as embodiments in which the trailer 150 includes an electric trailer braking system, the plurality of trailer brakes 152 are a plurality of electric trailer brakes that are electrically coupled to the electrical system of the towing vehicle 100. In some embodiments, such as embodiments in which the trailer 150 includes an electric-over-hydraulic trailer braking system, the trailer 150 includes an electric-over-hydraulic actuator 154 and a plurality of hydraulic trailer brakes. The electric-over-hydraulic actuator 154 transforms an electrical signal received from the towing vehicle 100 into a hydraulic signal used to activate the plurality of trailer brakes 152.

Still referring to FIG. 1, the towing vehicle 100 may be an automobile or any other passenger or non-passenger vehicle such as, for example, a tractor or a tractor truck. The towing vehicle 100 includes a system 110 for calculating trailer brake control parameters. The system 110 includes a communication path 111, one or more processors 112, one or more memory modules 114, a trailer brake activation input circuit 116, a trailer brake output circuit 118, a camera 120, a display 122, a speaker 124, network interface hardware 126, a microphone 128, and tactile input hardware 130. The various components of the system 110 and the interaction thereof will be described in detail below.

Still referring to FIG. 1, the communication path 111 may be formed from any medium that is capable of transmitting a signal such as, for example, conductive wires, conductive traces, optical waveguides, or the like. Moreover, the communication path 111 may be formed from a combination of mediums capable of transmitting signals. In one embodiment, the communication path 111 comprises a combination of conductive traces, conductive wires, connectors, and buses that cooperate to permit the transmission of electrical data signals to components such as processors, memories, sensors, input devices, output devices, and communication devices. Accordingly, the communication path 111 may comprise a towing vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 111 communicatively couples the various components of the system 110. As used herein, the term "communicatively coupled" means that coupled components are capable of exchanging data signals with one another such as, for example, electrical signals via conductive medium, electromagnetic signals via air, optical signals via optical waveguides, and the like.

Still referring to FIG. 1, each of the one or more processors 112 of the system 110 may be any device capable of executing machine readable instructions. Accordingly, each of the one or more processors 112 may be a controller, an integrated circuit, a microchip, a computer, or any other computing device. The one or more processors 112 are communicatively coupled to the other components of the system 110 by the communication path 111. Accordingly, the communication path 111 may communicatively couple any number of processors with one another, and allow the components coupled to the communication path 111 to operate in a distributed computing environment. Specifically, each of the components may operate as a node that may send and/or receive data.

Still referring to FIG. 1, the trailer brake activation input circuit 116 is coupled to the communication path 111 and communicatively coupled to the one or more processors 112. The trailer brake activation input circuit 116 provides a trailer brake activation signal to the one or more processors 112 that may be processed in order to determine when the at least one trailer brake 152 is to be activated. In some embodiments, the trailer brake activation input circuit 116 may include one or more sensors and/or devices for generating a signal which may be utilized by the system 110 in determining whether to activate the trailer brake 152. For example, in some embodiments, the trailer brake activation input circuit 116 may include one or more accelerometers, a towing vehicle brake pressure sensing circuit, a manual trailer brake activation input (e.g., a pushbutton, slider switch, and the like), a towing vehicle brake light circuit, or combinations thereof.

Still referring to FIG. 1, the trailer brake output circuit 118 is coupled to the communication path 111 and communicatively coupled to the one or more processors 112. The trailer brake output circuit 118 is electrically coupled to one or more components of the trailer 150 by a conductive medium, such as a conductive wire. In some embodiments, such as embodiments in which the trailer 150 includes an electric trailer braking system, the trailer brake output circuit 118 is electrically coupled to the plurality of trailer brakes 152. In some embodiments, such as embodiments in which the trailer 150 includes an electric-over-hydraulic trailer braking system comprising an electric-over-hydraulic actuator 154 and a plurality of hydraulic trailer brakes 152, the trailer brake output circuit 118 is electrically coupled to the electric-over-hydraulic actuator 154. The trailer brake output circuit 118 is controlled by the one or more processors 112 and supplies an electrical trailer brake output signal to the plurality of trailer brakes 152 (e.g., in embodiments in which the trailer 150 includes an electric trailer braking system) or to the electric-over-hydraulic actuator 154 (e.g., in embodiments in which the trailer 150 includes an electric-over-hydraulic trailer braking system) via the conductive medium when commanded by the one or more processors 112. In some embodiments, the trailer brake output circuit 118 may supply current from the power system of the towing vehicle 100. The trailer brake output circuit 118 generally includes one or more electrical components, such as resistors, capacitors, transistors, inductors, and the like. In some embodiments, the trailer brake output circuit 118 may include at least one power transistor, such as a MOSFET transistor.

Still referring to FIG. 1, each of the one or more memory modules 114 of the system 110 is coupled to the communication path 111 and communicatively coupled to the one or more processors 112. The one or more memory modules 114 may comprise RAM, ROM, flash memories, hard drives, or any device capable of storing machine readable instructions such that the machine readable instructions can be accessed and executed by the one or more processors 112. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 114. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 1, the one or more memory modules 114 may include one or more trailer brake control parameters. The trailer brake control parameters may include any parameter or variable that influences the electrical signal output by the trailer brake output circuit 118. For example, the trailer brake control parameters may include a system gain. The system gain may define a relationship between the trailer brake activation signal provided by the trailer brake activation input circuit 116 and the trailer brake output signal provided to the trailer 150 by the trailer brake output circuit 118. For example, in some embodiments, the trailer brake output signal may be a function of the trailer brake activation signal scaled by the system gain. The trailer brake control parameter may also include an estimate of the surface coefficient of friction or of a surface engaged by one or more wheels of the towing vehicle 100, which may influence the application of the plurality of trailer brakes 152. For example, when the surface coefficient of friction is estimated as low (e.g., when the towing vehicle is traveling on icy, wet, or snowy surfaces), the trailer brake output signal may be reduced or the system gain may be decreased. Similarly, when the surface coefficient of friction is estimated as high (e.g., when the towing vehicle is traveling on a dry surface), the trailer brake output signal may be increased or the system gain may be increased.

Still referring to FIG. 1, the camera 120 is coupled to the communication path 111 and communicatively coupled to the one or more processors 112. The camera 120 transforms light of an imaged field of view that is incident on an image sensor of the camera 120 into electrical signals indicative of the imaged field of view. The camera 120 may be any device capable of detecting radiation in an ultraviolet wavelength band, a visible light wavelength band, or an infrared wavelength band. The camera 120 may have any resolution.

Still referring to FIG. 1, the display 122 is coupled to the communication path 111 and communicatively coupled to the one or more processors 112. The display 122 may be any device capable of providing visual output such as, for example, an image of a trailer to be towed by the towing vehicle 100, information pertaining to a trailer characteristic or trailer brake control parameter, and/or information to facilitate the adjustment of a trailer characteristic or trailer brake control parameter, as will be described below. The display 122 may include any medium capable of transmitting an optical output such as, for example, a cathode ray tube, light emitting diodes, a liquid crystal display, a plasma display, or the like. Moreover, the display 122 may be a touchscreen that, in addition to providing optical information, detects the presence and location of a tactile input upon a surface of or adjacent to the display. Accordingly, each display may receive mechanical input directly upon the optical output provided by the display. Additionally, it is noted that the display 108 can include at least one of the one or more processors 102 and the one or memory modules 106. Additionally, it should be understood that in some embodiments, the system 110 does not include the display 122, such as in embodiments in which the system 110 does not provide visual output pertaining to trailer brake control.

Still referring to FIG. 1, the tactile input hardware 130 is coupled to the communication path 111 and communicatively coupled to the one or more processors 112. The tactile input hardware 130 may be any device capable of transforming mechanical, optical, or electrical signals into a data signal capable of being transmitted with the communication path 111. Specifically, the tactile input hardware 130 may include any number of movable objects that each transform physical motion into a data signal that can be transmitted to over the communication path 104 such as, for example, a button, a switch, a knob, or the like. In some embodiments, the display 122 and the tactile input hardware 130 are combined as a single module and operate as an audio head unit or an infotainment system. However, it is noted, that the display 122 and the tactile input hardware 130 may be separate from one another and operate as a single module by exchanging signals via the communication path 111.

Still referring to FIG. 1, the speaker 124 is coupled to the communication path 111 and communicatively coupled to the one or more processors 112. The speaker 124 transforms data signals from the system 110 into mechanical vibrations, such as in order to prompt for confirmation of a determined trailer characteristic, as will be described below. However, it should be understood that in other embodiments the system 110 may not include the speaker 124, such as in embodiments in which the system 110 does not provide an audible indication pertaining to trailer brake control.

Still referring to FIG. 1, the microphone 128 is coupled to the communication path 111 and communicatively coupled to the one or more processors 112. The microphone 128 may be any device capable of receiving a mechanical vibration at the microphone and transforming the received mechanical vibration into an electrical signal indicative of the received mechanical vibration.

Still referring to FIG. 1, network interface hardware 126 is coupled to the communication path 111 and communicatively coupled to the one or more processors 112. The network interface hardware may be any device capable of transmitting and/or receiving data via a network 160. Accordingly, the network interface hardware 126 can include a communication transceiver for sending and/or receiving any wired or wireless communication. For example, the network interface hardware 126 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 126 includes hardware configured to operate in accordance with the Bluetooth wireless communication protocol. In another embodiment, network interface hardware 126 may include a Bluetooth send/receive module for sending and receiving Bluetooth communications to/from a mobile device 166.

Still referring to FIG. 1, in some embodiments, the system 110 may be communicatively coupled to a mobile device 166 via the network 160. In some embodiments, the network 160 is a personal area network that utilizes Bluetooth technology to communicatively couple the system 110 and the mobile device 166. In other embodiments, the network 160 may include one or more computer networks (e.g., a personal area network, a local area network, or a wide area network), cellular networks, satellite networks and/or a global positioning system and combinations thereof. Accordingly, the system 110 can be communicatively coupled to the network 160 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 1, as stated above, the network 160 may be utilized to communicatively couple the system 110 with the mobile device 166. The mobile device 166 may include a mobile phone, a smartphone, a personal digital assistant, a camera, a dedicated mobile media player, a mobile personal computer, a laptop computer, and/or any other mobile device 166 capable of being communicatively coupled with the system 110. The mobile device 166 may include one or more processors and one or more memories. The one or more processors can execute logic to communicate with the system 110. The mobile device 166 may be configured with wired and/or wireless communication functionality for communicating with the system 110. In some embodiments, the mobile device 166 may perform one or more elements of the functionality described herein, such as in embodiments in which the functionality described herein is distributed between the system 110 and the mobile device 166.

Figure 2:
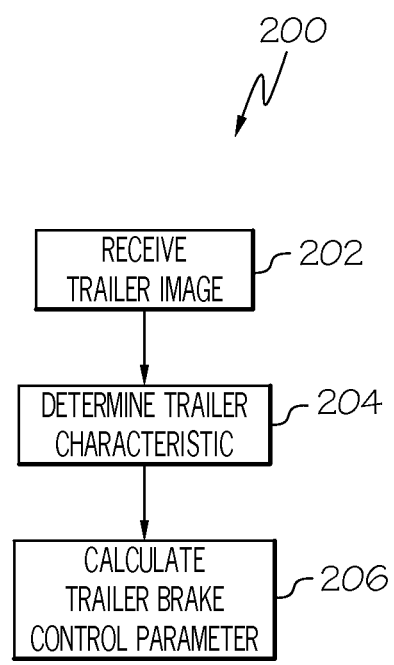
FIG. 2 schematically depicts a flowchart for calculating trailer brake control parameters, according to one or more embodiments shown and described herein.
Figure 3:
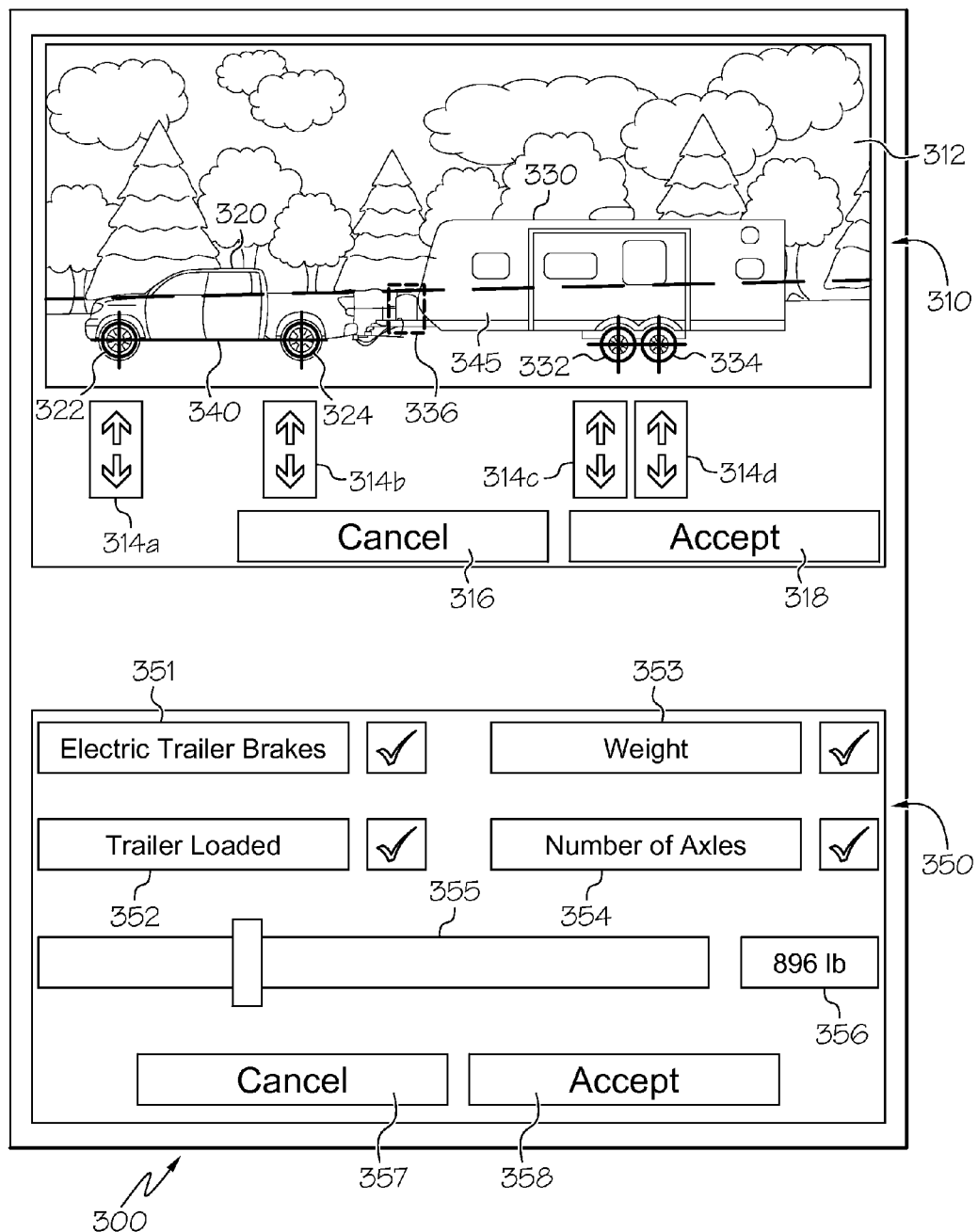
FIG. 3 schematically depicts a user interface for facilitating the calculation of trailer brake control parameters, according to one or more embodiments shown and described herein.

FIG. 2 schematically depicts a flowchart of a method 200 for calculating trailer brake control parameters. Referring now to FIGS. 1 and 2, at block 202, the machine readable instructions stored in the one or more memory modules 114, when executed by the one or more processors 112, cause the system 110 to receive an image including a trailer. In some embodiments, the image may be received by the system 110 from the camera 120, which transforms light of an imaged field of view into electrical signals indicative of the imaged field of view. In other embodiments, the image may be received by the network interface hardware 126 from the mobile device 166 via the network 160, such as in embodiments in which a user of the mobile device 166 utilizes a camera of the mobile device 166 to capture an image including the trailer and the image is transmitted to the network interface hardware 126 via the network 160. In other embodiments, the image may be received by the system 110 in other ways, such as when a removable media storage device (e.g., an SD card or USB driver) including the image is communicatively coupled to the communication path 111 and the image is transmitted to the system 110. Referring now to FIG. 3, which schematically depicts a graphical user interface 300 for facilitating the calculation or trailer brake control parameters, an image 312 including a towing vehicle object 320 and a trailer object 330 is depicted on a first region of the graphical user interface 300. The graphical user interface 300 and the manner in which it may be used to facilitate the calculation of trailer brake control parameters will be described in further detail below.

Still referring to FIGS. 1 and 2, at block 204, the machine readable instructions stored in the one or more memory modules 114, when executed by the one or more processors 112, cause the system 110 to determine a trailer characteristic from the image received at block 202 using image analysis logic stored in the one or more memory modules 114. By way of non-limiting example, the trailer characteristic may include a trailer size, a trailer length, a trailer weight, a trailer shape, a number of trailer axles, or a trailer type. In some embodiments, the trailer characteristic may be determined from the image based on one or more identified features or objects of the image, as will be now described in further detail. However, it should be understood that in other embodiments, the trailer characteristic may be determined based on features or objects other than those explicitly set forth below. Furthermore, in some embodiments, the trailer characteristic may be determined based on the received image without identifying features or objects of the image as described herein.

Still referring to FIGS. 1 and 2, the image analysis logic stored in the one or more memory modules 114 may be configured to identify one or more features or objects of the image. By way of non-limiting example, the image analysis logic may be configured to identify a trailer object in the image, to identify a towing vehicle object in the image, to identify one or more wheels of the towing vehicle in the image, to identify one or more wheels of the trailer in the image, to identify a towing vehicle wheel line (e.g., a line extending between the center point of a front wheel and a back wheel of the towing vehicle, depicted as towing vehicle wheel line 340 in FIG. 3) in the image, to identify a towing vehicle belt line (e.g., a line extending along the interface of the bottom of the towing vehicle windows and the towing vehicle body, depicted as towing vehicle belt line 345 in FIG. 3) in the image, or the like. In some embodiments, the image analysis logic may include a feature descriptor algorithm or an image descriptor algorithm, such as a Scale-Invariant Feature Transform ("SIFT") algorithm, a Speeded Up Robust Feature ("SURF") algorithm, a Histogram of Oriented Gradients ("HOG") algorithm, a Generalized Search Tree ("GIST") algorithm, a Fast Retina Keypoint ("FREAK") algorithm, a Binary Robust Invariant Scalable Keypoints ("BRISK") algorithm, or the like.

Still referring to FIGS. 1 and 2, the image analysis logic stored in the one or more memory modules 114 may be configured to determine the trailer characteristic based on the identified features or objects of the image. For example, in some embodiments, the trailer characteristic is a trailer length. In some embodiments, the trailer length is determined by identifying the trailer in the image, determining an image length of the trailer (i.e., a length of a trailer object identified in the image), identifying a towing vehicle in the image, determining an image length of the towing vehicle (i.e., a length of a towing vehicle object identified in the image), and determining the trailer length based on the image length of the trailer and the image length of the towing vehicle. In some embodiments, the trailer length is determined by calculating a ratio of the image length of the trailer to the image length of the towing vehicle, and then multiplying the ratio by a known length of the towing vehicle, which may be stored in the one or more memory modules 114. For example, if the ratio of the image length of the trailer and the image length of the towing vehicle is 1.5 and the towing vehicle has a known length of 209.8 inches, the length of the trailer may be calculated as 314.7 inches (209.8 inches*1.5). In other embodiments, the trailer length may be determined in a different manner, such as based on a distance of the camera from the trailer.

Still referring to FIGS. 1 and 2, the system 110 may be configured to determine a trailer weight as the determined trailer characteristic. In some embodiments, the trailer weight is determined by identifying a towing vehicle in the image, identifying a belt line of the towing vehicle in the image, identifying a wheel line of the towing vehicle in the image, determining an angle between the belt line and the wheel line, and determining the trailer weight based on the angle between the belt line and the wheel line. In some embodiments, the belt line of the towing vehicle is determined by identifying the windows of the towing vehicle, identifying the bottoms of the windows, identifying the towing vehicle body, identifying the interface of the bottom of the towing vehicle windows and the towing vehicle body, and determining the belt line as extending along the interface of the bottom of the towing vehicle windows and the towing vehicle body. In some embodiments, the wheel line of the towing vehicle is determined by identifying a front wheel of the towing vehicle, identifying a rear wheel of the towing vehicle, identifying a center point of the front wheel, identifying a center point of the rear wheel, and determining the wheel line of the towing vehicle as extending between the center point of the front wheel and the center point of the rear wheel. The angle between the belt line of the towing vehicle and the wheel line of the towing vehicle may be determined using any image processing technique or geometric determination algorithm, such as by calculating a slope of the belt line, calculating a slope of the wheel line, and comparing the calculated slopes. The trailer weight may then be determined based on the angle between the belt line and the wheel line. For example, when the belt line and the wheel line are parallel, the weight of the trailer may be determined to be less than when the belt line is at an angle relative to the wheel line, which may be indicative of sagging of the towing vehicle caused by a heavy trailer mechanically coupled to a hitch of the towing vehicle. In other embodiments, the trailer weight may be determined in a different manner, such as based on a size of the trailer in the image, a number of trailer wheels, the number and type of items detected on the trailer, or the like.

Still referring to FIGS. 1 and 2, the system 110 may be configured to determine a number of trailer axles as the determined trailer characteristic. In some embodiments, the number of trailer axles may be determined by identifying a trailer in the image, identifying a number of trailer wheels in the image, and determining the number of trailer axles based on the number of trailer wheels. For example, when an image of the trailer is taken from a side view (as depicted in FIG. 3), the number of trailer axles may be determined as equal to the number or trailer wheels.

Still referring to FIGS. 1 and 2, the system 110 may be configured to determine a trailer type as the determined trailer characteristic. In some embodiments, the trailer type may be an electric trailer or an electric-over-hydraulic trailer. In some embodiments, the trailer type may be determined by identifying the trailer in the image, determining whether the trailer includes an electric-over-hydraulic brake actuator (e.g., the electric-over-hydraulic actuator 336 in FIG. 3), and determining the trailer type based on whether the trailer includes the electric-over-hydraulic brake actuator. In some embodiments, when the trailer does not include the electric-over-hydraulic brake actuator, the trailer type is determined as an electric trailer. In some embodiments, when the trailer includes the electric-over-hydraulic brake actuator, the trailer type is determined as an electric-over-hydraulic trailer. For example, referring to FIG. 3, the image includes the electric-over-hydraulic actuator 336, and the trailer type is determined to be an electric-over-hydraulic trailer.

In some embodiments, a user of the system 110 may confirm a determined trailer characteristic or adjust a determined trailer characteristic. For example, referring to FIG. 3, in some embodiments, a graphical user interface 300 may be provided, such as in embodiments when the graphical user interface 300 is displayed on the display 122 or in embodiments in which the graphical user interface 300 is displayed on a display of the mobile device 166. The graphical user interface 300 includes an image portion 310 and a settings portion 350. The image portion 310 includes a captured image 312. In some embodiments, the captured image 312 includes an unprocessed image received by the system 110, such as an image received from the camera 120 or an image captured by a camera of the mobile device 166 and transmitted via the network 160 to the network interface hardware 126 of the system 110. In other embodiments, the captured image 312 may be processed before being displayed, such as when a portion of the background is removed.

Still referring to FIG. 3, the image 312 includes a towing vehicle object 320 and a trailer object 330. In some embodiments, the image 312 may include a plurality of elements generated by the system 110 that are overlaid on the image 312. For example, the embodiment depicted in FIG. 3 includes a front towing vehicle wheel locator 322, a rear towing vehicle wheel locator 324, a front trailer wheel locator 332, a rear trailer wheel locator 334, an electric-over-hydraulic actuator locator 336, a towing vehicle wheel line 340, and a towing vehicle belt line 345. In some embodiments, the front towing vehicle wheel locator 322 is automatically generated and overlaid on the image 312, such as in embodiments in which the system 110 identifies a front wheel of the towing vehicle object 320 in the image 312, and provides for display the front towing vehicle wheel locator 322 centered on the identified front wheel. Likewise, in some embodiments, the rear towing vehicle wheel locator 324 is automatically generated and overlaid on the image 312, such as in embodiments in which the system 110 identifies a rear wheel of the towing vehicle object 320 in the image 312, and provides for display the rear towing vehicle wheel locator 324 centered on the identified rear wheel. In a similar manner, the front trailer wheel locator 332 and the rear trailer wheel locator 334 may be automatically generated and overlaid over respective wheels of the trailer object 330. In some embodiments, a user may be able to adjust the position of the front towing vehicle wheel locator 322, the rear towing vehicle wheel locator 324, the front trailer wheel locator 332, and the rear trailer wheel locator 334, such as by manipulating the plurality of adjustment arrows 314*a*, 314*b*, 314*c*, and 314*d* depicted in FIG. 3. In some embodiments, the plurality of adjustment arrows 314*a*, 314*b*, 314*c*, and 314*d* may be presented on a touch screen interface (e.g., when the graphical user interface 300 is displayed on the display 122 when the display 122 is a touchscreen display or when the graphical user interface 300 is displayed on a touchscreen interface of the mobile device 166). When the user has completed adjustment of the positions of the wheel locators, the user may confirm the adjusted positions by manipulating the accept button 318. The cancel button 316 may be manipulated to restore the wheel locator positions to automatically determined positions for example. In some embodiments, one or more of the front towing vehicle wheel locator 322, the rear towing vehicle wheel locator 324, the front trailer wheel locator 332, and the rear trailer wheel locator 334 may not be automatically positioned over corresponding wheels, such as in embodiments in which a user must input the locations of each of the wheel locators, such as by tapping a touchscreen displaying the image 312 at the respective locations of the wheels. Some embodiments may not include the wheel locators, such as embodiments that may automatically determine the locations of one or more wheels of the towing vehicle or trailer without the need for input from a user.

Still referring to FIG. 3, the towing vehicle wheel line 340 extends between a center of the front towing vehicle wheel locator 322 and the rear towing vehicle wheel locator 324. The towing vehicle belt line 345 extends along the interface between the bottom of the towing vehicle windows and the towing vehicle body. In some embodiments, the towing vehicle belt line 345 may be displayed by identifying the windows of the towing vehicle, identifying the bottoms of the windows, identifying the towing vehicle body, identifying the interface of the bottom of the towing vehicle windows, and displaying the towing vehicle belt line 345 as extending along the interface of the bottom of the towing vehicle windows and the towing vehicle body. The towing vehicle belt line 345 and the towing vehicle wheel line 340 may be used for a variety of purposes, including calculating the towing vehicle weight, as described in detail above. Some embodiments may not display the towing vehicle wheel line 340 or the towing vehicle belt line 345, such as embodiments that automatically calculate trailer characteristics (e.g., the trailer weight) based on the towing vehicle wheel line 340 or the towing vehicle belt line 345 without displaying the lines.

Still referring to FIG. 3, the electric-over-hydraulic actuator locator 336 may be automatically generated and overlaid on the image 312. For example, in some embodiments the system 110 identifies an electric-over-hydraulic actuator in the image 312, and provides for display the electric-over-hydraulic actuator locator 336 near or over the identified electric-over-hydraulic actuator in the image 312.

Referring to FIGS. 1 and 3, some embodiments provide for display a graphical user interface 300 including a trailer characteristic determined by the system 110, prompt a user to confirm the trailer characteristic, and receive a confirmation of the trailer characteristic. For example, in the embodiment depicted in FIG. 3, the settings portion 350 of the graphical user interface displays a plurality of trailer characteristics, including a trailer type 351, a trailer loaded status 352, a weight 353, and a number of axles 354. Each of these trailer characteristics may have been determined by the system 110 based on the received image, as described in detail above. The user may be prompted to confirm one or more of the characteristics, such as by clicking the accept button 358 to confirm that the determined trailer characteristics are accurate. The system may receive a confirmation of the trailer characteristic in response to the selection of the accept button 358. Furthermore, the user may unselect one or more trailer characteristics, such as by unchecking the box next to the trailer characteristic to be unselected, such that the system 110 does not calculate the trailer brake control parameter based on the unselected trailer characteristic. For example, if a user were to uncheck the number of axles 354 trailer characteristic, the system 110 may determine a trailer brake control parameter (e.g., system gain) without regard for the number of trailer axles. In some embodiments, the user may confirm a trailer characteristic when the system 110 outputs an audible indication of the determined trailer characteristic (e.g., by outputting "electric trailer brakes detected. Please confirm." through the speaker 124), and receiving confirmation from the user (e.g., receiving "yes" through the microphone 128, or receiving an indication that a user manipulated a confirm button, or the like).

Still referring to FIGS. 1 and 3, some embodiments provide for display a graphical user interface including a trailer characteristic determined by the system 110, prompt a user to adjust the trailer characteristic, receive an adjustment to the trailer characteristic, and adjust the trailer characteristic based on the received adjustment. For example, in some embodiments, the user may manipulate any of the trailer type 351, the trailer loaded status 352, the weight 353, and the number of axles 354 buttons to toggle among options for the respective trailer characteristics, or may select a value for the respective trailer characteristics from a drop-down menu. In some embodiments, a user may adjust any of the trailer characteristics by first manipulating the appropriate trailer characteristic button, and then adjust a value of the trailer characteristic by manipulating the slider 355. For example, in the embodiment depicted in FIG. 3, a user has selected the weight 353 trailer characteristic and may adjust the weight by manipulating the slider 355 from the current value 356 of 896 pounds. The user may be prompted to confirm an adjustment to one or more of the characteristics, such as by clicking the accept button 358 to confirm that the adjustments are complete. The system may receive an adjustment to the trailer characteristic and adjust the trailer characteristic based on the received adjustment in response to the selection of the accept button 358.

Referring once again to FIGS. 1 and 2, at block 206, the machine readable instructions stored in the one or more memory modules 114, when executed by the one or more processors 112, cause the system 110 to calculate the trailer brake control parameter based on the trailer characteristic determined at block 204. The one or more memory modules 114 may be updated to include the calculated trailer brake control parameter, such as by replacing the value of the trailer brake control parameter with the calculated value. In some embodiments, the trailer brake control parameter is calculated as a function of two or more trailer characteristics.

Still referring to FIGS. 1 and 2, in some embodiments, the system 110 calculate a system gain as a function of trailer size, trailer length, trailer weight, or a number of trailer axles. In some embodiments, the system gain is calculated as an increasing function of the trailer characteristics, such as when the system gain is an increasing function of trailer size, trailer length, trailer weight, or number of trailer axles. In some embodiments, the system gain is calculated as higher when the trailer type is an electric trailer than when the trailer type is an electric-over-hydraulic trailer. In some embodiments, the system gain is calculated as a function of two or more trailer characteristics.

Some embodiments may allow a user to confirm or adjust one or more determined trailer brake control parameters, such as by displaying the trailer brake control parameter to be confirmed or adjusted on a graphical user interface and receiving user input indicative of the confirmation of the parameter or the adjustment to the parameter.

Some embodiments may modify one or more vehicle parameters of the towing vehicle 100 (e.g., whether rear proximity sensors are activated, whether a tow-haul mode is active, transmission shift points, outside mirror position, whether a mirror is dimmed, or the like) based on the determined trailer characteristic. For example, some embodiments may disable one or more rear proximity sensors, such as clearance sonar sensors, of the towing vehicle 100 when a trailer is detected in the received image. By way of another non-limiting example, when a loaded trailer is detected in the received image, a tow-haul mode may be activated and/or transmission shift points may be changed. As another non-limiting example, the outside mirror positions may be adjusted based on a determined trailer size, such as when the outside mirrors are automatically extended by an actuator when the trailer size is above a threshold size.

Some embodiments may modify one or more trailer brake parameters based on features of the received image other than determined trailer characteristics. For example, some embodiments may detect whether snow is present in an image. The surface coefficient of friction trailer brake control parameter may be modified when snow is detected in the image, such as by lowering the surface coefficient of friction when snow is detected in the image. Some embodiments may modify one or more trailer brake parameters based on other information, such as traffic information provided to the system 110 from a traffic information source via communication with the mobile device 166 or another communication channel (e.g., a satellite modem, cellular modem, or other communication device communicatively coupled to the system 110). For example, trailer brake output may be automatically reduced when the towing vehicle 100 is stopped and traffic is determined to be heavy. As another non-limiting example, the estimated surface coefficient of friction may be modified based on weather information provided to the system 110 from a traffic information source via communication with the mobile device 166 or another communication channel (e.g., a satellite modem, cellular modem, or other communication device communicatively coupled to the system 110).

After the trailer brake control parameter is calculated at block 206, the trailer brake output circuit 118 may output a trailer brake output signal in response to a trailer brake activation signal from the trailer brake activation input circuit 116 in accordance with the calculated trailer brake control parameter. For example, when the trailer brake control parameter is a system gain calculated based on a trailer characteristic determined from a received trailer image, the trailer brake output circuit 118 output by the trailer brake output circuit 118 may be a function of the trailer brake activation signal supplied by the trailer brake activation input circuit 116, scaled by the calculated system gain.

It should now be understood that embodiments described herein provide systems and methods for calculating trailer brake controller parameters. Automatically calculating trailer brake controller parameters based on trailer characteristics determined from received images as described herein may allow for a convenient and intuitive way for trailer brake control parameters to be appropriately set when a user simply takes a photograph of the trailer, without requiring a user to known the appropriate trailer brake control parameters or to known the trailer characteristics. Furthermore, the ability for a user to confirm or adjust determined trailer brake parameters or trailer characteristics, as described herein, may allow a user to fine tune the system determinations and to customize the way in which the system calculates trailer brake control parameters.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for outputting a trailer brake output signal, the system comprising:
   one or more processors;
   one or more memory modules communicatively coupled to the one or more processors, wherein the one or more memory modules include a trailer brake control parameter;
   a trailer brake activation input circuit communicatively coupled to the one or more processors;
   a trailer brake output circuit communicatively coupled to the one or more processors, wherein the trailer brake output circuit outputs the trailer brake output signal;
   machine readable instructions stored in the one or more memory modules that cause the system to perform at least the following when executed by the one or more processors:
      receive an image including a trailer;
      determine a trailer characteristic from the image using image analysis logic stored in the one or more memory modules;
      calculate the trailer brake control parameter based on the trailer characteristic; and
      output the trailer brake output signal with the trailer brake output circuit in response to a trailer brake activation signal received from the trailer brake activation input circuit and in accordance with the calculated trailer brake control parameter.

2. The system of claim 1, wherein the trailer characteristic includes at least one of a trailer size, a trailer length, a trailer weight, a trailer shape, a number of trailer axles, and a trailer type.

3. The system of claim 1, wherein the trailer brake control parameter includes a system gain.

4. The system of claim 1, wherein the trailer characteristic is a trailer length, and the machine readable instructions stored in the one or more memory modules, when executed by the one or more processors, cause the system to determine the trailer length by:
   identifying the trailer in the image;
   determining an image length of the trailer;
   identifying a towing vehicle in the image;
   determining an image length of the towing vehicle; and
   determining the trailer length based on the image length of the trailer and the image length of the towing vehicle.

5. The system of claim 1, wherein the trailer characteristic is a trailer weight, and the machine readable instructions stored in the one or more memory modules, when executed by the one or more processors, cause the system to determine the trailer weight by:
   identifying a towing vehicle in the image;
   identifying a belt line of the towing vehicle in the image;
   identifying a wheel line of the towing vehicle in the image;
   determining an angle between the belt line and the wheel line; and
   determining the trailer weight based on the angle between the belt line and the wheel line.

6. The system of claim 1, wherein the trailer characteristic is a number of trailer axles, and the machine readable instructions stored in the one or more memory modules, when executed by the one or more processors, cause the system to determine the number of trailer axles by:
   identifying the trailer in the image;
   identifying a number of trailer wheels in the image; and determining the number of trailer axles based on the number of trailer wheels.

7. The system of claim 1, wherein the trailer characteristic is a trailer type, and the machine readable instructions stored in the one or more memory modules, when executed by the one or more processors, cause the system to determine the trailer type by:
identifying the trailer in the image;
determining whether the trailer includes an electric-over-hydraulic brake actuator; and
determining the trailer type based on whether the trailer includes the electric-over-hydraulic brake actuator, wherein the trailer type is a electric trailer when the trailer does not include the electric-over-hydraulic brake actuator, and wherein the trailer type is an electric-over-hydraulic trailer when the trailer includes the electric-over-hydraulic brake actuator.

8. The system of claim 1, wherein:
the trailer characteristic includes at least one of a trailer size, a trailer length, a trailer weight, and a number of trailer axles;
the trailer brake control parameter includes a system gain; and
the system gain is calculated as an increasing function of the trailer characteristic.

9. The system of claim 1, wherein:
the trailer characteristic includes a trailer type;
the trailer brake control parameter includes a system gain; and
the system gain calculated when the trailer type is an electric trailer is greater than when the trailer type is an electric-over-hydraulic trailer.

10. The system of claim 1, wherein the machine readable instructions stored in the one or more memory modules further cause the system to perform at least the following when executed by the one or more processors:
provide for display a graphical user interface including the trailer characteristic;
prompt a user to adjust the trailer characteristic;
receive an adjustment to the trailer characteristic;
adjust the trailer characteristic based on the received adjustment; and
calculate the trailer brake control parameter based on the adjusted trailer characteristic.

11. The system of claim 1, wherein the machine readable instructions stored in the one or more memory modules further cause the system to perform at least the following when executed by the one or more processors:
provide for display a graphical user interface including the trailer characteristic;
prompt a user to confirm the trailer characteristic; and
receive a confirmation of the trailer characteristic.

12. The system of claim 1, wherein the trailer brake control parameter includes a system gain, wherein the machine readable instructions stored in the one or more memory modules, when executed by the one or more processors, cause the system to:
calculate the system gain based on the trailer characteristic determined from the image; and
output the trailer brake output signal as a function of the trailer brake activation signal, scaled by the system gain.

13. A system for calculating a trailer brake control parameter comprising:
one or more processors;
one or more memory modules communicatively coupled to the one or more processors, wherein the one or more memory modules include a trailer brake control parameter;
machine readable instructions stored in the one or more memory modules that cause the system to perform at least the following when executed by the one or more processors:
receive an image including a trailer;
determine a trailer characteristic from the image using image analysis logic stored in the one or more memory modules;
prompt a user to adjust the trailer characteristic;
receive an adjustment to the trailer characteristic;
adjust the trailer characteristic based on the received adjustment; and
calculate the trailer brake control parameter based on the adjusted trailer characteristic.

14. The system of claim 13, wherein the machine readable instructions stored in the one or more memory modules further cause the system to perform at least the following when executed by the one or more processors:
provide for display a graphical user interface including the determined trailer characteristic;
prompt a user to confirm the determined trailer characteristic; and
receive a confirmation of the determined trailer characteristic.

15. The system of claim 13, wherein the trailer brake control parameter includes a system gain.

16. The system of claim 15, wherein:
the trailer characteristic includes at least one of a trailer size, a trailer length, a trailer weight, and a number of trailer axles; and
the system gain is calculated as an increasing function of the trailer characteristic.

17. The system of claim 13, further comprising:
a trailer brake output circuit communicatively coupled to the one or more processors, wherein the trailer brake output circuit outputs a trailer brake output signal; and
a trailer brake activation input circuit communicatively coupled to the one or more processors, wherein the machine readable instructions stored in the one or more memory modules, when executed by the one or more processors, cause the system to output the trailer brake output signal with the trailer brake output circuit in response to a trailer brake activation signal received from the trailer brake activation input circuit and in accordance with the calculated trailer brake control parameter.

18. The system of claim 17, wherein the trailer brake control parameter includes a system gain, wherein the machine readable instructions stored in the one or more memory modules, when executed by the one or more processors, cause the system to:
calculate the system gain based on the trailer characteristic determined from the image; and
output the trailer brake output signal as a function of the trailer brake activation signal, scaled by the system gain.

19. A method for outputting a trailer brake output signal, the method comprising:
receiving, by a computer, an image including a trailer;
determining a trailer characteristic from the image with image analysis logic stored in one or more memory modules of the computer;

calculating, by the computer, a trailer brake control parameter based on the trailer characteristic; and outputting the trailer brake output signal with a trailer brake output circuit in response to a trailer brake activation signal received from a trailer brake activation input circuit and in accordance with the calculated trailer brake control parameter.

20. The method of claim 19, wherein the trailer characteristic includes at least one of a trailer size, a trailer length, a trailer weight, a trailer shape, a number of trailer axles, and a trailer type.

21. The method of claim 19, wherein the trailer brake control parameter includes a system gain.

22. The method of claim 19, wherein:
the trailer characteristic includes at least one of a trailer size, a trailer length, a trailer weight, and a number of trailer axles;
the trailer brake control parameter includes a system gain; and
the system gain is calculated as an increasing function of the trailer characteristic.

23. The method of claim 19, wherein:
the trailer characteristic includes a trailer type;
the trailer brake control parameter includes a system gain; and
the system gain calculated when the trailer type is an electric trailer is greater than when the trailer type is an electric-over-hydraulic trailer.

24. The method of claim 19, wherein the trailer brake control parameter includes a system gain, the method further comprising:
calculating the system gain based on the trailer characteristic determined from the image; and
outputting the trailer brake output signal as a function of the trailer brake activation signal, scaled by the system gain.

* * * * *